(12) United States Patent
Ezen Can et al.

(10) Patent No.: US 10,740,555 B2
(45) Date of Patent: Aug. 11, 2020

(54) DEEP LEARNING APPROACH TO GRAMMATICAL CORRECTION FOR INCOMPLETE PARSES

(71) Applicant: International Business Machines Corporation, Armonk, NY (US)

(72) Inventors: Aysu Ezen Can, Cary, NC (US); Roberto Delima, Apex, NC (US); David Contreras, Willow Spring, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 15/834,640

(22) Filed: Dec. 7, 2017

(65) Prior Publication Data

US 2019/0179887 A1    Jun. 13, 2019

(51) Int. Cl.
| | | |
|---|---|---|
| *G10L 15/22* | (2006.01) | |
| *G06F 17/27* | (2006.01) | |
| *G06F 40/211* | (2020.01) | |
| *G06F 40/205* | (2020.01) | |
| *G06N 7/00* | (2006.01) | |
| *G06N 20/00* | (2019.01) | |
| *G06F 40/216* | (2020.01) | |
| *G06F 40/253* | (2020.01) | |
| *G06F 40/284* | (2020.01) | |

(52) U.S. Cl.
CPC ......... *G06F 40/205* (2020.01); *G06F 40/211* (2020.01); *G06F 40/216* (2020.01); *G06F 40/253* (2020.01); *G06F 40/284* (2020.01); *G06N 7/00* (2013.01); *G06N 20/00* (2019.01)

(58) Field of Classification Search
USPC .......................................................... 704/9
See application file for complete search history.

(56) References Cited

U.S. PATENT DOCUMENTS

| | | | | |
|---|---|---|---|---|
| 5,799,269 | A * | 8/1998 | Schabes | G06F 40/253 704/9 |
| 8,190,627 | B2 * | 5/2012 | Platt | G06F 16/242 707/767 |
| 9,164,983 | B2 * | 10/2015 | Liu | G06F 40/274 |
| 9,190,054 | B1 * | 11/2015 | Riley | G06F 16/3338 |
| 9,390,078 | B2 * | 7/2016 | Israel | G06F 40/232 |
| 9,483,459 | B1 * | 11/2016 | Riley | G06F 16/3329 |
| 10,592,604 | B2 * | 3/2020 | Pusateri | G10L 15/30 |
| 2005/0154580 | A1 * | 7/2005 | Horowitz | G10L 15/19 704/9 |
| 2005/0171926 | A1 * | 8/2005 | Thione | G10L 15/22 |
| 2009/0119095 | A1 * | 5/2009 | Beggelman | G06F 40/30 704/9 |

(Continued)

*Primary Examiner* — Seong-Ah A Shin (74) *Attorney, Agent, or Firm* — Patterson + Sheridan, LLP (57) ABSTRACT

Performing an operation comprising determining that a parse of an input string comprising a plurality of tokens is incomplete, generating, based on a machine learning (ML) model: (i) a plurality of candidate addition tokens for adding to the input string, and (ii) a plurality of candidate removal tokens for removing from the input string, selecting, from the plurality of candidate addition tokens and the plurality of candidate removal tokens, a first candidate token, and modifying the input string based on the first candidate token to facilitate a complete parse of the modified input string by a parser.

20 Claims, 9 Drawing Sheets

(56) References Cited

U.S. PATENT DOCUMENTS

| | | | |
|---|---|---|---|
| 2011/0087670 A1* | 4/2011 | Jorstad | G10L 15/1822 707/741 |
| 2012/0166180 A1* | 6/2012 | Au | G06F 40/253 704/9 |
| 2013/0085754 A1* | 4/2013 | Cohen | G06F 40/274 704/235 |
| 2015/0186355 A1* | 7/2015 | Baldwin | G06F 40/232 704/9 |
| 2015/0227619 A1* | 8/2015 | Xie | G06F 40/205 707/706 |
| 2015/0379399 A1* | 12/2015 | Baughman | G06F 40/211 706/13 |
| 2016/0062980 A1* | 3/2016 | Boguraev | G06N 5/04 706/11 |
| 2016/0062981 A1* | 3/2016 | Dogrultan | G06F 40/166 704/9 |
| 2016/0180215 A1* | 6/2016 | Vinyals | G06F 40/205 706/20 |
| 2017/0132187 A1* | 5/2017 | Contreras | G06F 40/205 |
| 2017/0177563 A1 | 6/2017 | Dahlmeier et al. | |
| 2017/0374093 A1* | 12/2017 | Dhar | G06F 16/332 |
| 2018/0113867 A1* | 4/2018 | Erpenbach | G06F 40/10 |
| 2018/0143956 A1* | 5/2018 | Skarbovsky | G06F 40/166 |
| 2019/0079754 A1* | 3/2019 | Makkar | G06F 40/30 |

\* cited by examiner

DEEP LEARNING APPROACH TO GRAMMATICAL CORRECTION FOR INCOMPLETE PARSES

BACKGROUND

The present invention relates to sentence parsing, and more specifically, to a deep learning approach to grammatical correction for incomplete parses.

Understanding natural language and finding entity relationships in text is a difficult task for computing systems. Often, computing systems rely on rich natural language text to extract information that can be used in decision making processes. One such example is extracting disease-related information from electronic medical records for use by medical logic to generate treatment recommendations. Syntactic and structural information is required to extract entity relations in natural language. Parse trees are a source of information about entity relations that can be processed. Therefore, many systems rely on parse trees to extract information about entity relations. However, if parsing of a sentence fails (e.g., a complete parse tree cannot be generated), information cannot be extracted therefrom. Furthermore, converting an incomplete parse to a complete parse is challenging.

SUMMARY

According to one embodiment, a method comprises determining that a parse of an input string comprising a plurality of tokens is incomplete, generating, based on a machine learning (ML) model: (i) a plurality of candidate addition tokens for adding to the input string, and (ii) a plurality of candidate removal tokens for removing from the input string, selecting, from the plurality of candidate addition tokens and the plurality of candidate removal tokens, a first candidate token, and modifying the input string based on the first candidate token to facilitate a complete parse of the modified input string by a parser.

In another embodiment, a system comprises a processor and a memory storing instructions, which when executed by the processor, performs an operation comprising determining that a parse of an input string comprising a plurality of tokens is incomplete, generating, based on a machine learning (ML) model: (i) a plurality of candidate addition tokens for adding to the input string, and (ii) a plurality of candidate removal tokens for removing from the input string, selecting, from the plurality of candidate addition tokens and the plurality of candidate removal tokens, a first candidate token, and modifying the input string based on the first candidate token to facilitate a complete parse of the modified input string by a parser.

In another embodiment, a computer-readable storage medium has computer-readable program code embodied therewith, the computer-readable program code executable by a processor to perform an operation comprising determining that a parse of an input string comprising a plurality of tokens is incomplete, generating, based on a machine learning (ML) model: (i) a plurality of candidate addition tokens for adding to the input string, and (ii) a plurality of candidate removal tokens for removing from the input string, selecting, from the plurality of candidate addition tokens and the plurality of candidate removal tokens, a first candidate token, and modifying the input string based on the first candidate token to facilitate a complete parse of the modified input string by a parser.

DETAILED DESCRIPTION

Embodiments disclosed herein leverage unsupervised deep learning techniques to grammatically correct strings to convert an incomplete parse of the string into a complete parse. Generally, embodiments disclosed herein predict one or more candidate modifications to each pair of tokens (e.g., characters, symbols, words) in a string (e.g., a sentence) based on one or more machine learning (ML) models. The candidate modifications may include adding one or more tokens (e.g., characters, symbols, words, etc.) between the token pairs, and/or removing one or more tokens from the token pairs. A score may be computed for each candidate modification, and each candidate modification may be applied to the string based on the computed scores until a modification is applied that results in a string that can be parsed into a parse tree.

Figure 1:
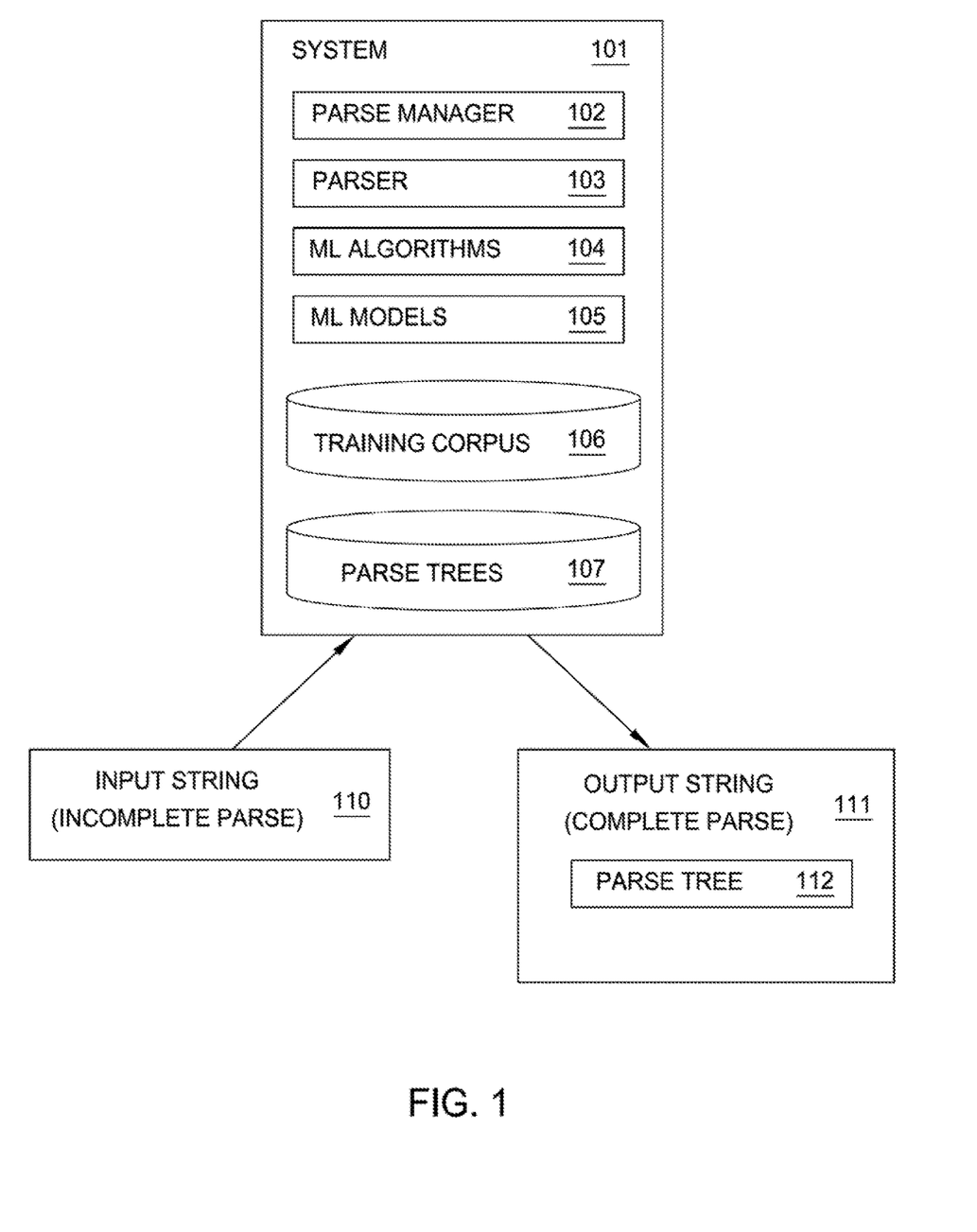
FIG. 1 illustrates a computing system which implements a deep learning approach to grammatical correction for incomplete parses, according to one embodiment.

FIG. 1 illustrates a computing system 101 which implements a deep learning approach to grammatical correction for incomplete parses, according to one embodiment. As shown, the computing system 101 includes a parse manager 102, a parser 103, one or more ML algorithms 104, one or more ML models 105, and a training corpus 106. The parse manager 102 is configured to modify an input string 110 (e.g., a sentence) that cannot be parsed by the parser 103 (e.g., results in an incomplete parse) into an output string 111 that can be parsed by the parser 103. The parser 103 is configured to determine the grammatical structure of strings, and generate one or more parse trees 107 for the strings. For example, the parser 103 may determine which words of a string go together (e.g., as phrases), and which words of the string are the subject or object of a verb. A parse tree is an ordered, rooted tree that represents the syntactic structure of a string (e.g., a sentence) according to a context-free grammar. A context-free grammar is a set of rules that describe all possible strings in a given formal language. The rules define replacements to elements of the strings (e.g., converting uppercase "A" to lowercase "a").

The ML algorithms 104 are representative of any number and type of ML algorithm. Generally, a machine learning algorithm is a type of artificial intelligence that automatically learns and improves accuracy of predictions without being explicitly programmed to do so. For example, each ML algorithm 104 may be able to make corrections to the input string 110 without being trained on the specific errors present in the input string 110 that result in an incomplete parse of the input string 110. The ML algorithms 104 may be trained on a training corpus 106, which includes a plurality of textual strings. The strings in the training corpus 106 may include strings that can be parsed by the parser 103. Based on the training corpus 106, the ML algorithms 104 generate one or more ML models 105. The ML models 105 are representative of any type of machine learning model. The ML models 105 generally include data describing attributes of the text in the training corpus 106. For example, the ML models 105 may specify weights reflecting how frequently a pair of words appear within a context window (e.g., a 4-word window of text), how frequently other tokens (e.g., commas, semicolons, etc.) appear between a pair of words, and the like.

To correct to the input string 110, the parse manager 102 leverages the ML models 105 to determine, for each pair of words in the input string 110, a set of candidate additions and a set of candidate removals. The set of candidate additions are representative of any type of addition to the input string 110 that would convert the input string 110 into a grammatically correct output string 111 that can be parsed by the parser 103. Therefore, for example, if the input string 110 includes the terms "we going to the store", a candidate addition would include adding the token" "are" between the terms "we going" in the input string 110. The set of candidate removals include tokens that can be removed from the input string 110 to allow the parser 103 to complete a parse of the input string 110. For example, if the input string 110 includes the terms "we. went to the store", a candidate removal would specify to remove the "." from the input string 110. The parse manager 102 may further compute a score for each candidate addition and/or candidate removal based on the weights specified in the ML models 105. In at least one embodiment, the parse manager 102 discards candidate additions and/or candidate removals having scores that do not exceed respective score thresholds. In such embodiments, the parse manager 102 generates a minimum score threshold for candidate removals and a minimum score threshold for candidate additions.

The parse manager 102 then applies the candidate additions and/or removals to the input string 110 based on the computed scores, e.g., by performing the highest scoring candidate additions and/or removals first. If the modifications to the input string 110 correct the grammatical errors such that the input string 110 can be parsed by the parser 103, the parse manager 102 applies the modifications accordingly (e.g., by removing tokens from the input string 110 and/or adding tokens to the input string 110). However, if a given candidate addition and/or candidate removal does not result in string that can be parsed by the parser 103, the parse manager 102 continues to apply candidate additions and/or candidate removals until the input string 110 is modified into a string that can be parsed by the parser 103. Once the parse manager 102 modifies the input string 110 into a grammatically correct output string 111, the parser 103 may parse the output string 111 and generate a parse tree 107 for the output string 111.

Figure 2A:
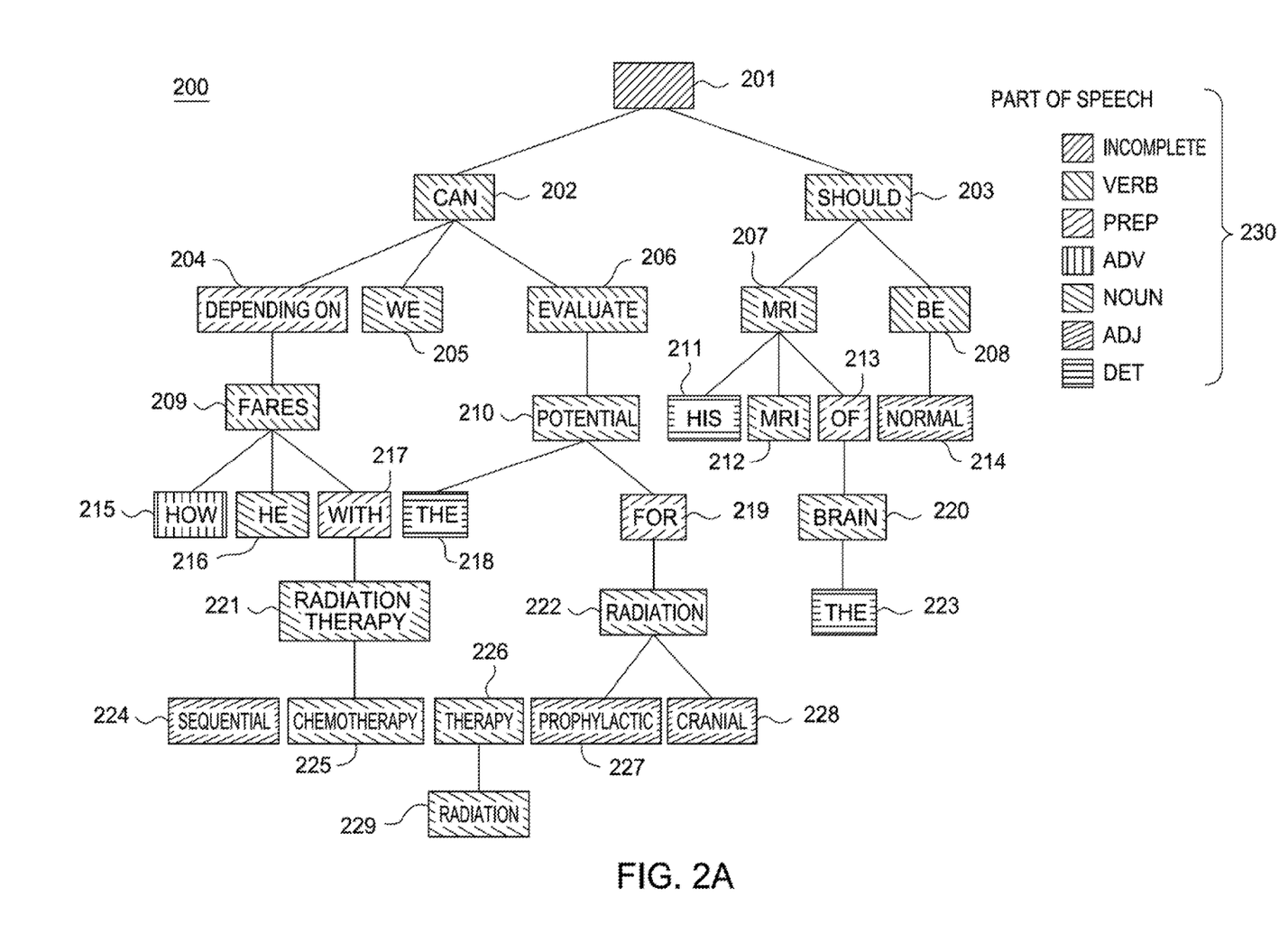
FIGS. 2A-2B illustrate a deep learning approach to add tokens to a sentence to complete an incomplete sentence parse, according to one embodiment.

FIG. 2A depicts an incomplete parse tree 200 generated based on an incomplete parse of a string generated by the parser 103, according to one embodiment. In the example depicted in FIG. 2A, the example input string may be "depending on how he fares with sequential chemotherapy radiation, we can evaluate the potential for prophylactic cranial radiation should his MRI of the brain be normal." A legend 230 specifies which part of speech the parser 103 applied to each term. As shown, the parse tree 200 includes example nodes 201-229, where each node 202-229 is associated with a word and/or a symbol of the string (e.g., a period and/or a comma), and the corresponding part of speech determined by the parser 103. However, as shown, node 201 is not associated with any word, character, and/or symbol, as the parser 103 could not complete a parse of the string. Instead, the node 201 is representative of a missing element of the string required to complete the parse of the string.

As previously stated, the parse manager 102 leverages the ML models 105 to generate a set of candidate additions and a set of candidate removals for the input string. The candidate additions would specify to add one or more tokens (which are inclusive of symbols, characters, words, or any other type of text) to the input string. The candidate removals would specify to remove one or more tokens from the input string. The parse manager 102 computes a respective score for each candidate addition and each candidate removal based on the weights specified in the ML models 105. The parse manager 102 then applies the highest scoring candidate addition and/or candidate removal to determine whether the modification results in a string that can be parsed by the parser. For example, the parse manager 102 may generate a first candidate addition that specifies to add a comma between the words "radiation" and "should", where the first candidate addition has the highest score among all candidate additions and all candidate removals generated by the parse manager 102. The parse manager 102 may apply this candidate addition to the input string, and determine that the resultant string can be parsed by the parser 103, converting an incomplete parse of the string to a complete parse.

Figure 2B:
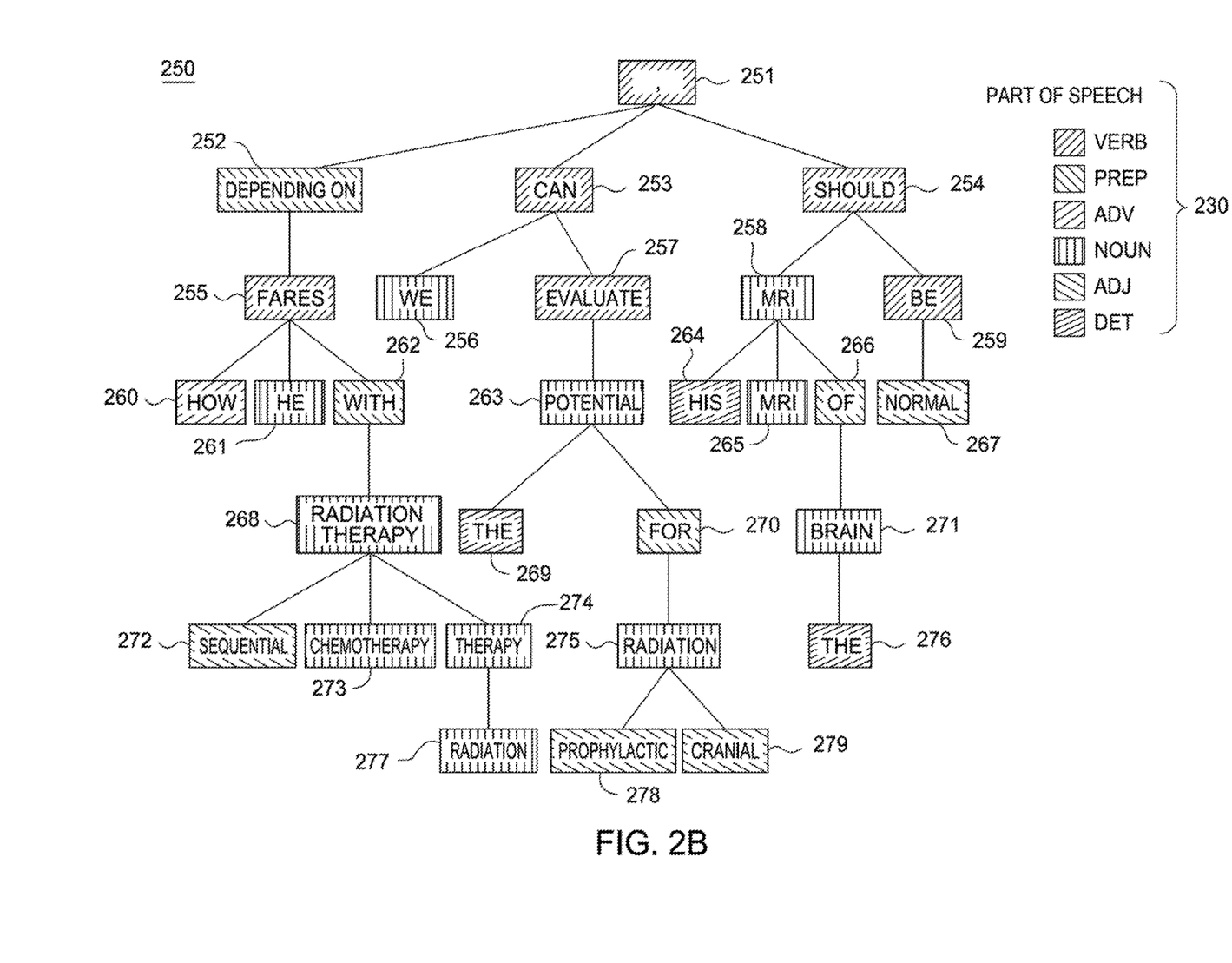

FIG. 2B depicts a parse tree 250 generated by the parser 103 based on the modified string "depending on how he fares with sequential chemotherapy radiation, we can evaluate the potential for prophylactic cranial radiation, should his MM of the brain be normal" generated by the parse manager 102. By adding the comma to the string, the parse manager 102 generated a string that can be parsed by the parser 103. The comma is represented by node 251 of the tree 250, which further includes nodes 252-270 that represent a given token of the modified string generated by the parse manager 102.

Figure 3A:
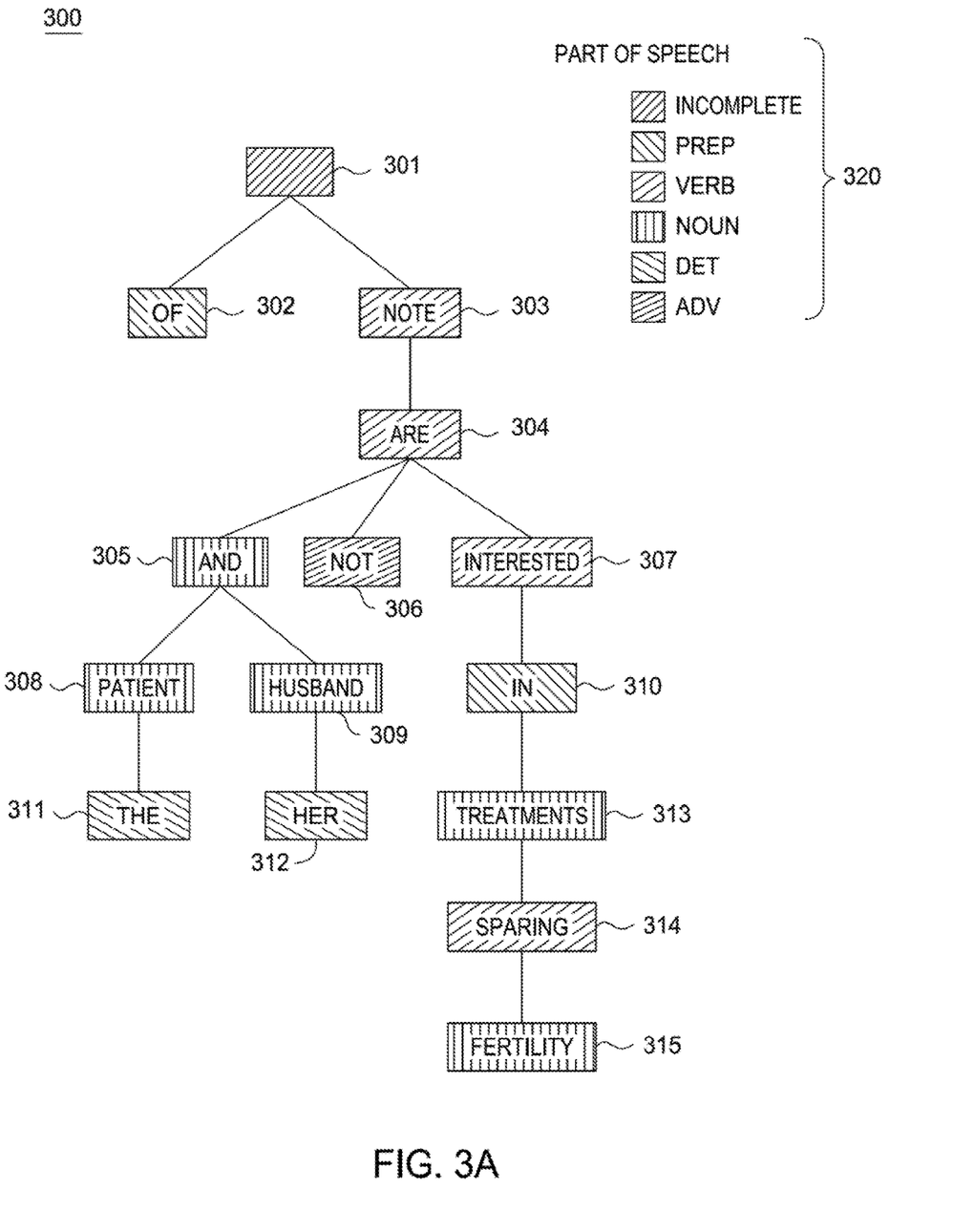
FIGS. 3A-3B illustrate a deep learning approach to removing tokens from a sentence to complete an incomplete sentence parse, according to one embodiment.

FIG. 3A depicts an incomplete parse tree 300 generated based on an incomplete parse of a string generated by the parser 103, according to one embodiment. In the example depicted in FIG. 3A, the example input string may be "of, note the patient and her husband are not interested in fertility-sparing treatments". The parse tree 300 includes nodes 301-315, where node 301 is associated with an incomplete parse of the input string, and nodes 302-315 are associated with other tokens in the input string, and the corresponding parts of speech reflected in the legend 320.

Figure 3B:
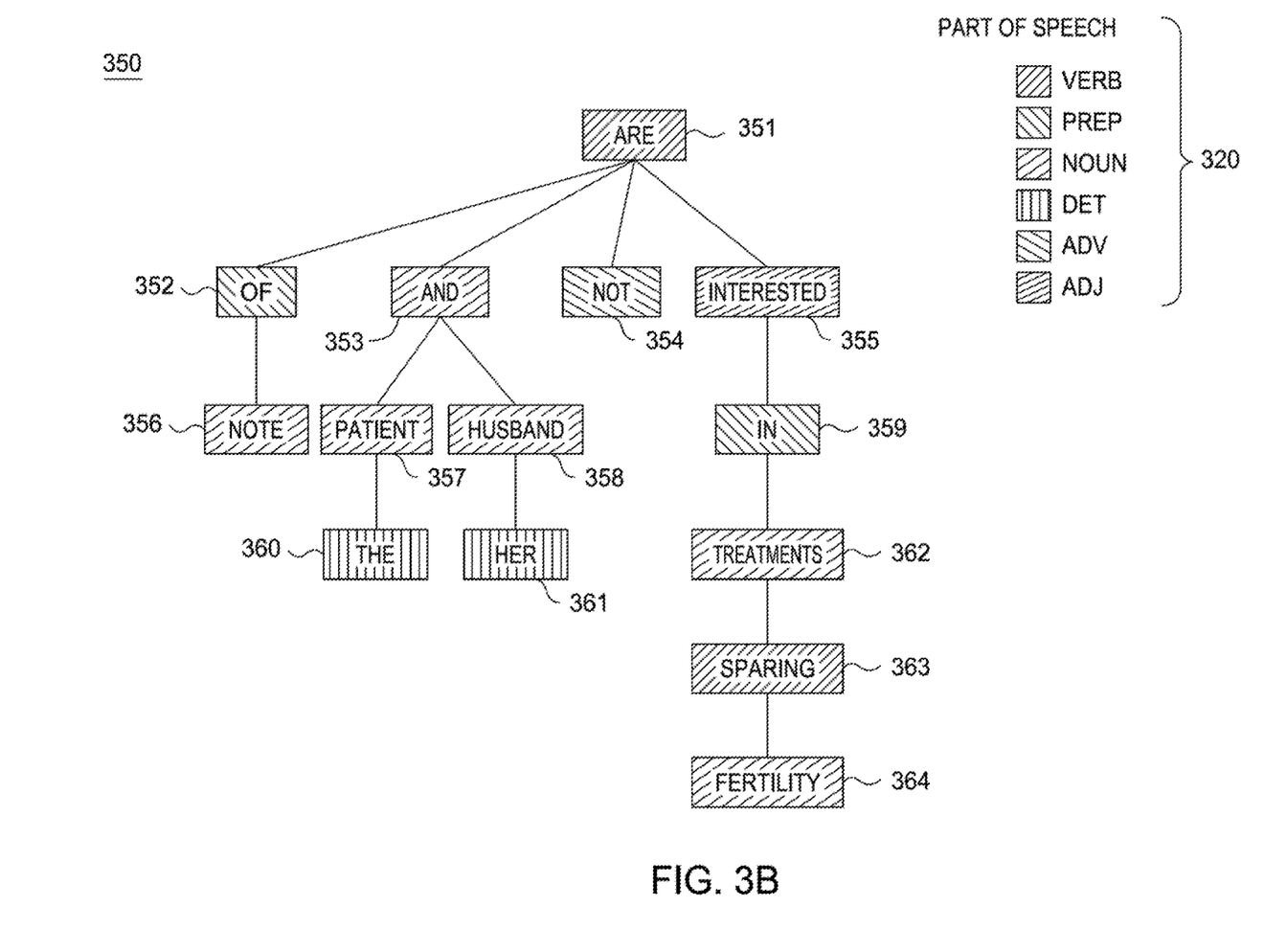

As stated, the parse manager 102 leverages the ML models 105 to generate a set of candidate additions and a set of candidate removals for the input string. For example, a candidate removal specifying to remove the "," from the string may have the highest score computed by the parse manager 102 for all candidate additions and candidate removals. As such, the parse manager 102 may apply the candidate removal (e.g., remove the comma from the string). The parse manager 102 may then determine that the modified string can be parsed by the parser 103. As such, the parse manager 102 removes the comma, and the parser 103 parses the resultant modified string. FIG. 3B depicts an example parse tree 350 generated by the parser 103 for the modified string "of note the patient and her husband are not interested in fertility-sparing treatments" generated by the parse manager 102. As shown, the parser 103 was able to parse the modified string, and generated the parse tree 350 including nodes 351-364.

Figure 4:
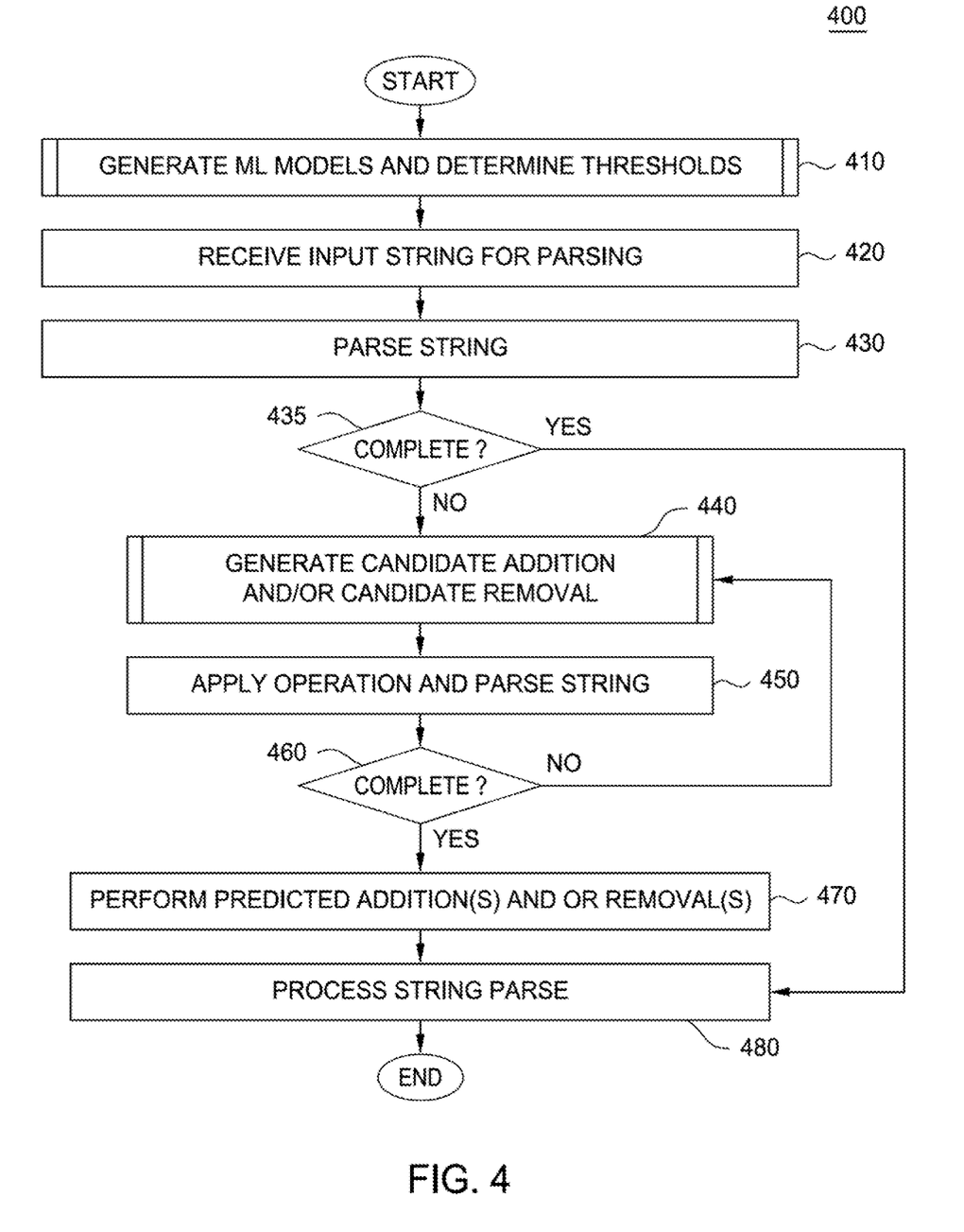
FIG. 4 is a flow chart illustrating a method for a deep learning approach to grammatical correction for incomplete parses, according to one embodiment.

FIG. 4 is a flow chart illustrating a method 400 for a deep learning approach to grammatical correction for incomplete parses, according to one embodiment. As shown, the method 400 begins at block 410, described in greater detail with reference to FIG. 5, where the ML models 105 are generated during a training phase of the ML algorithms 104, and the minimum score threshold for candidate additions and the minimum score threshold for candidate removals are determined. Generally, the ML algorithms 104 generate the ML models 105 based on the strings in the training corpus 106, where the ML models 105 specify weights used to determine candidate additions and candidate removals to correct grammatical errors in strings. At block 420, the parse manager 102 receives an input string for parsing by the parser 103. At block 430, the parser 103 attempts to parse the input string. At block 435, the parse manager 102 determines whether the attempted parse by the parser 103 was complete. If the parse was complete, the method proceeds to block 490. Otherwise, the input string includes at least one error and resulted in an incomplete parse, and the method proceeds to block 440.

At block 440, described in greater detail with reference to FIG. 6, the parse manager 102 generates one or more candidate removals and/or candidate additions to the string to convert the string into a string that can be parsed by the parser 103. Stated differently, at block 440, the parse manager 102 predicts one or more tokens that can be added to the string, and/or one or more tokens that can be removed from the string. Each candidate addition and/or candidate removal may be associated with a respective confidence score. The parse manager 102 may return the candidate removal and/or the candidate addition having the highest confidence score. Furthermore, the parse manager 102 generally determines whether the candidate removal and/or candidate addition generated at block 440 exceeds a corresponding confidence score threshold. If the confidence score does not exceed the threshold, the parse manager 102 discards the candidate.

At block 450, the parse manager 102 applies the candidate addition and/or removal returned at block 440 to the input string, and the parser 103 attempts to parse the modified string. For example, the highest scoring candidate addition may specify to add a token to the input string. As another example, the highest scoring candidate removal may specify to remove a token from the string. If two or more candidates have the same score, the parse manager 102 may break the tie by selecting one of the candidates at random, or in a round-robin approach (e.g., selecting a candidate removal, followed by selecting a candidate addition to break a subsequent tie). Once the candidate operation is applied, the parser 103 attempts to parse the modified sentence. At block 460, the parser 103 and/or the parse manager 102 determine whether the attempted parse of the modified string performed at block 450 results in a complete parse. If the parse is incomplete, the parse manager 102 returns to block 440, where the next highest scoring candidate removal and/or candidate addition is returned and applied to the string. The parse manager 102 continues until the input string is modified such that the modified string can be parsed by the parser 103. At block 470, the parse manager 102 applies each candidate removal and/or candidate addition to the string. At block 480, the parser 103 parses the modified input string, generating a parse tree which can be stored in the parse trees 107 for further analysis.

Figure 5:
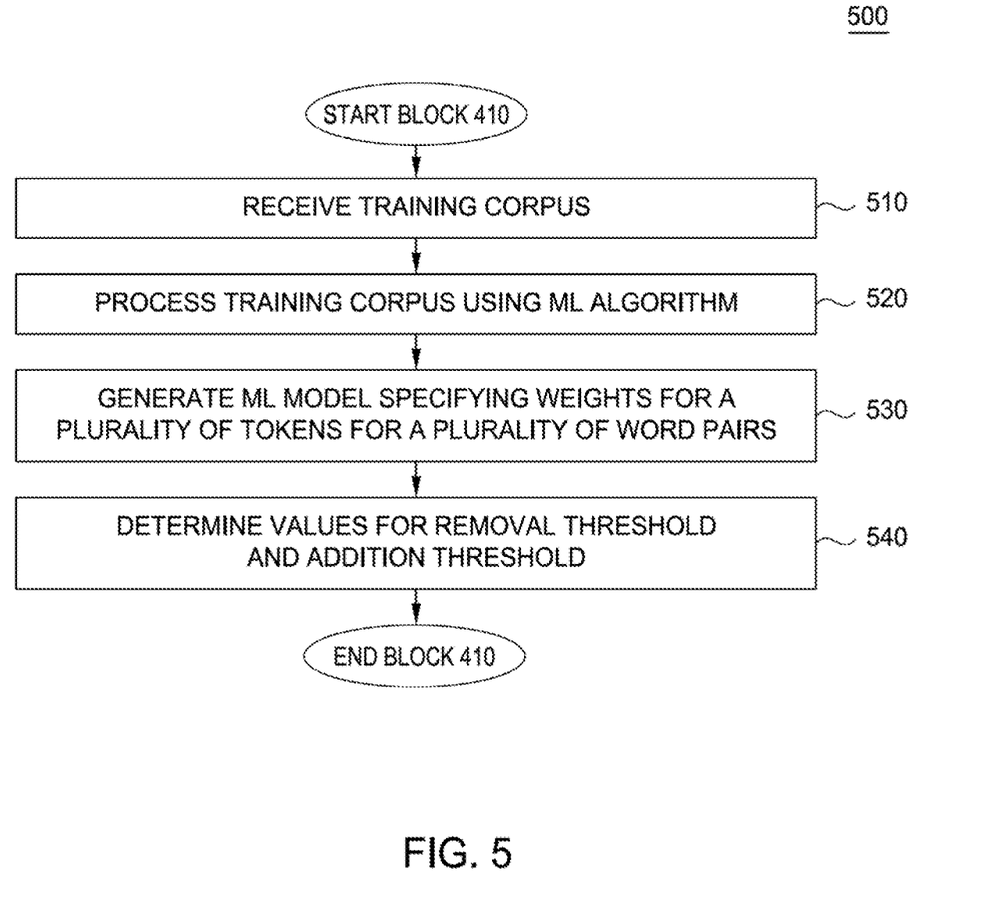
FIG. 5 is a flow chart illustrating a method to generate one or more machine learning models and determine thresholds, according to one embodiment.

FIG. 5 is a flow chart illustrating a method 500 corresponding to block 410 to generate one or more machine learning models and determine thresholds, according to one embodiment. As shown, the method 500 begins at block 510, where the training corpus 106 comprising a plurality of text strings is received by one or more ML algorithms 104. At block 520, the selected ML algorithms 104 process the text of the training corpus 106. Generally, in processing the training corpus 106, the ML algorithms 104 are able to identify patterns, attributes, and other indicators which reflect the structure of strings that can be parsed by the parser 103. At block 530, the ML algorithms 104 generate one or more ML models 105. The ML models 105 may specify weights for a plurality of tokens relative to a respective word pair, of a plurality of word pairs appearing in the training corpus 106. For example, a given ML model 105 may specify weights indicating to remove the semicolon from the following string "hello; world", since the training corpus 106 did not include a significant number of instances of the string "hello; world", and the semicolon is likely to be an error. Similarly, the ML model 105 may specify weights for tokens that can be added to word pairs, where the weights reflect the most likely addition that would result in a grammatically correct string.

At block 540, the parse manager 102 determines values for the removal confidence score threshold and the addition confidence score threshold. Each threshold corresponds to a respective value learned by the parse manager 102 which reflects the greatest accuracy in retaining or discarding candidate removals and candidate additions. Generally, the parse manager 102 learns the corresponding values by observing the thresholds that lead to the best performance in correcting grammatical errors in strings. For example, the removal threshold may be 0.4 on a scale from 0.0 to 1, and the addition threshold may be 0.7 on a scale from 0.0 to 1.0. In such an example, the parse manager 102 determines that discarding candidate removals that do not have a confidence score of 0.4 or greater results in applying the greatest number of removals that are most likely to convert an incomplete parse to a complete parse of the string. Similarly, the parse manager 102 determines that discarding candidate additions that do not have a confidence score of 0.7 or greater results in applying the greatest number of additions that are most likely to convert an incomplete parse to a complete parse of the string.

Figure 6:
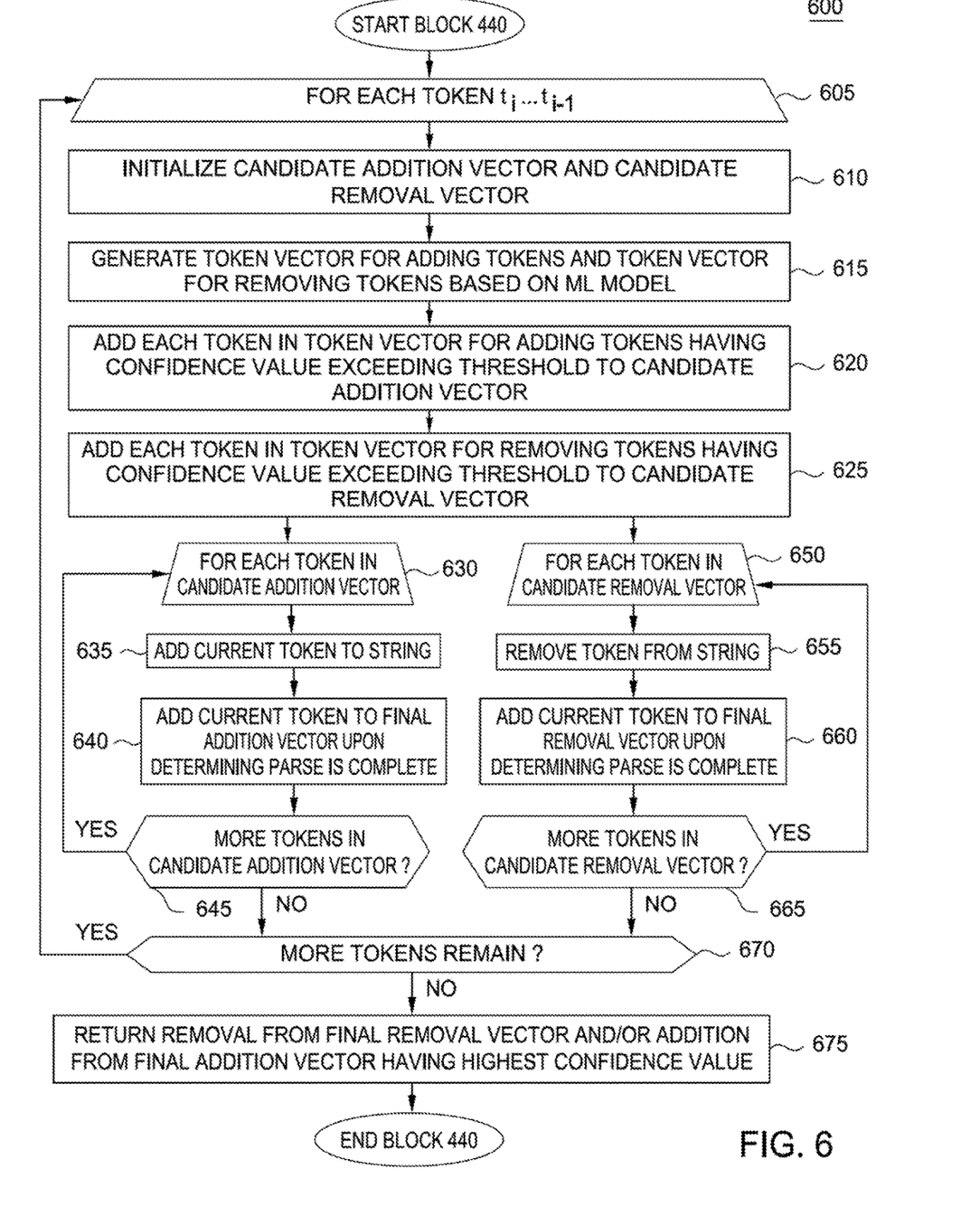
FIG. 6 is a flow chart illustrating a method to predict a token using token addition and/or token removal, according to one embodiment.

FIG. 6 is a flow chart illustrating a method 600 corresponding to block 440 to predict a token using token addition and/or token removal, according to one embodiment. As shown, the method 600 begins at block 605, where the parse manager 102 executes a loop including blocks 610-670 for each token $t_1 \ldots t_{i-1}$, where i is the number of tokens in the input string. At block 610, the parse manager 102 initializes (e.g., creates) a candidate addition vector A, and a candidate removal vector R for the current token of the string. At block 615, the parse manager 102 generates a token vector $A_i$ for adding tokens to the string between $t_i$ and $t_{i+1}$. The parse manager 102 also generates a token vector $R_i$ for candidate removals, which reflects whether a token should be between tokens $t_i$ and $t_{i+2}$ of the string. The parse manager 102 generates the vectors $A_i$ and $R_i$ based on the ML models 105. Generally, the vectors $A_i$ and $R_i$ reflect the most likely additions and removals, respectively, to the string based on the ML models 105. Each entry of the vectors $A_i$, $R_i$ also includes a respective confidence score value computed by the parse manager 102 based on the weights specified in the ML models 105. At block 620, the parse manager 102 adds each token in the token vector $A_i$ having a confidence score value exceeding the determined addition threshold to the candidate addition vector A. The parse manager 102 discards any tokens from the vector $A_i$ having a confidence score that does not exceed the addition threshold from further consideration. At block 630, the parse manager 102 adds each token in the token vector $R_i$ having a confidence score value exceeding the determined removal threshold to the candidate addition vector R. The parse manager 102 discards any tokens from the vector $R_i$ having a confidence score that does not exceed the removal threshold from further consideration.

At block 630, the parse manager 102 executes a loop including blocks 635-645 for each token in the candidate addition vector A, which includes each candidate token that exceeds the addition threshold. In parallel, the parse manager 102 executes a loop including blocks 650-665 for each token in the candidate removal vector R, which includes each candidate removal that exceeds the removal threshold. At block 635, the parse manager 102 adds the current token from the candidate addition vector A to the string. Once the token is added (e.g., between tokens $t_i$ and $t_{i+1}$ of the string, where i corresponds to the current token of the string), the parse manager 102 provides the modified string to the parser 103, which attempts to parse the modified string. If the parser 103 can parse the modified string, the current candidate addition from the vector A (including confidence score) is added to a final addition vector FA. If the parser 103 cannot parse the modified string, the parse manager 102 does not add the current candidate addition from the candidate addition vector A to the final addition vector FA. At block 645, the parse manager 102 determines whether more tokens exist in the candidate addition vector A. If more tokens exist in the candidate addition vector A, the parse manager 102 returns to block 630. Otherwise, the parse manager 102 proceeds to block 670.

Returning to block 650, the parse manager 102 proceeds to block 655, where the parse manager 102 removes the token $t_{i+1}$ from the string, where token $t_{i+1}$ is between tokens $t_i$ and $t_{i+2}$, and token $t_{i+1}$ is the current removal token in the candidate removal vector R. The parse manager 102 may then invoke the parser 103 to parse the modified string. If the parser 103 can parse the modified string, the parse manager 102 adds the current token from the removal vector R to a final removal vector RV at block 660. At block 665 the parse manager 102 determines whether more tokens exist in the candidate removal vector R. If more tokens exist in the candidate removal vector R, the parse manager 102 returns to block 650. Otherwise, the parse manager 102 proceeds to block 670.

At block 670, the parse manager 102 returns the removal from the final removal vector RV and/or the addition from the final addition vector AV having the highest confidence score. For example, if the highest scoring candidate addition from the final addition vector AV has a confidence score of 0.92, and the highest scoring candidate removal from the final removal vector RV has a confidence score of 0.95, the parse manager 102 returns the removal having the confidence score of 0.95. The parse manager 102 may then apply the candidate removal, and attempt to parse the string using the parser 103. If the parse is complete, the parse manager 102 has converted an incomplete parse into a complete parse. If the parse remains incomplete, the parse manager 102 returns the candidate removal RV or the candidate addition AV having the next-highest confidence score. Doing so allows the parse manager 102 to most efficiently identify candidate additions and/or removals that correct grammatical errors in the input string.

Figure 7:
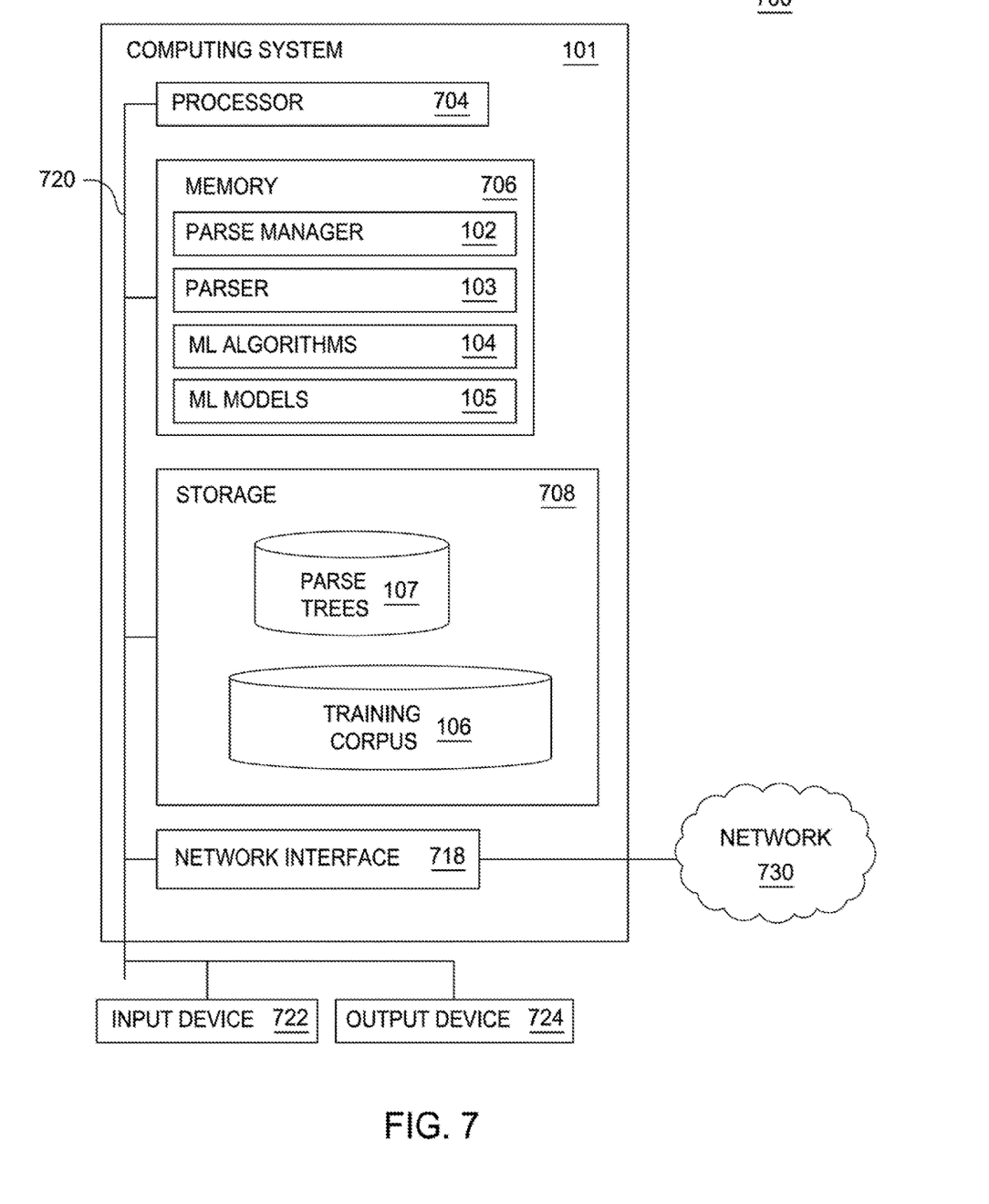
FIG. 7 illustrates a system which implements a deep learning approach to grammatical correction for incomplete parses, according to one embodiment.

FIG. 7 illustrates a system 700 which implements a deep learning approach to grammatical correction for incomplete parses, according to one embodiment. The networked system 700 includes the computing system 101 of FIG. 1. The computing system 101 may also be connected to other computers via a network 730. In general, the network 730 may be a telecommunications network and/or a wide area network (WAN). In a particular embodiment, the network 730 is the Internet.

The computing system 101 generally includes a processor 704 which obtains instructions and data via a bus 720 from a memory 706 and/or a storage 708. The computing system 101 may also include one or more network interface devices 718, input devices 722, and output devices 724 connected to the bus 720. The computing system 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computing system 101 to communicate with other computers via the network 730.

The storage 708 is representative of hard-disk drives, solid state drives, flash memory devices, optical media and the like. Generally, the storage 708 stores application programs and data for use by the computing system 101. In addition, the memory 706 and the storage 708 may be considered to include memory physically located elsewhere; for example, on another computer coupled to the computing system 101 via the bus 720.

The input device 722 may be any device for providing input to the computing system 101. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computing system 101. The output device 724 may include output devices such as monitors, touch screen displays, and so on.

As shown, the memory 706 contains the parse manager 102, the parser 103, the ML algorithms 104, and the ML models 105, each described in greater detail above. As shown, the storage 708 contains the training corpus 106 and the parse trees 107, each described in greater detail above. Generally, the system 700 is configured to implement all systems, methods, and functionality described above with reference to FIGS. 1-6.

Advantageously, embodiments disclosed herein provide a machine learning approach to correcting grammatical errors in strings. By leveraging the ML models, embodiments disclosed herein are efficiently able to identify the removals and/or additions that would most likely convert an input string into a string that can be parsed by a parser. Doing so improves the performance of the computing system 101 by reducing the amount of time and resources consumed in correcting grammatical errors, and refraining from wasting system resources by attempting to apply each and every candidate removal or addition. Similarly, the parsing performance of the computing system 101 is improved by rapidly generating complete parses of initially incomplete parses of strings.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the parse manager 102 could execute on a computing system in the cloud and correct grammatical errors in strings. In such a case, the parser 103 could generate parse trees 107 for the modified strings, and store the parse trees 107 and/or the modified strings at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   determining, by a parser executing on a processor, that a parse of an input string comprising a plurality of tokens is incomplete;
   generating, based on a machine learning (ML) model: (i) a plurality of candidate addition tokens for adding to the input string, and (ii) a plurality of candidate removal tokens for removing from the input string, comprising, for a first token of the plurality of tokens:
      identifying a second token of the plurality of tokens, wherein the second token is immediately subsequent to the first token in the input string;
      processing the first and second tokens using the ML model to generate a potential new token to be inserted between the first and second tokens without removing either the first or second token from the input string;
      identifying a third token of the plurality of tokens, wherein the third token is immediately subsequent to the second token in the input string; and
      processing the first and third tokens using the ML model to generate a potential removal token indicating a confidence that the second token should be removed from the input string;
   selecting, from the plurality of candidate addition tokens and the plurality of candidate removal tokens, a first candidate token; and
   modifying the input string based on the first candidate token to facilitate a complete parse of the modified input string by the parser.

2. The method of claim 1, wherein the first candidate token comprises a first candidate addition token of the plurality of candidate addition tokens, wherein the first candidate token is selected based on a confidence score for the first candidate token exceeding a respective confidence score for each of the plurality of candidate addition tokens and each of the plurality of candidate removal tokens, wherein modifying the input string comprises:
   identifying a first and a second token of the plurality of tokens associated with the first candidate addition token; and
   inserting the first candidate addition token between the first token and the second token in the input string.

3. The method of claim 1, wherein the first candidate token comprises a first candidate removal token of the plurality of candidate removal tokens, wherein the first candidate token is selected based on a confidence score for the first candidate token exceeding a respective confidence score for each of the plurality of candidate addition tokens and each of the plurality of candidate removal tokens, wherein modifying the input string comprises:
   identifying a first and a second token of the plurality of tokens associated with the first candidate removal token; and removing the first candidate removal token from the input string, wherein the first candidate removal token is disposed between the first and second tokens in the unmodified input string.

4. The method of claim 1, wherein each of the plurality of candidate addition tokens is associated with a respective confidence score that exceeds an addition threshold, wherein each of the plurality of candidate removal tokens is associated with a respective confidence score that exceeds a removal threshold.

5. The method of claim 1, further comprising:
determining that the parser can parse the modified input string; and
parsing the modified input string by the parser to generate a parse tree representing the modified input string.

6. The method of claim 1, further comprising:
determining that the parser cannot parse the modified input string;
selecting, from the plurality of candidate addition tokens and the plurality of candidate removal tokens, a second candidate token;
modifying the input string based on the second candidate token; and
determining that the parser can parse the input string modified based on the second candidate token.

7. The method of claim 1, further comprising prior to determining the parse of the input string is incomplete:
receiving a training corpus comprising a plurality of strings;
training the ML model based on the training corpus, wherein the ML model learns, for each respective token in the training corpus, a respective plurality of weights relative to each respective pair of tokens in the training corpus, wherein each of the plurality of weights indicates either (i) a confidence that the respective token should be inserted between the respective pair of tokens, or (ii) a confidence that the respective token should be removed from between the respective pair of tokens.

8. A computer program product, comprising:
a non-transitory computer-readable storage medium having computer readable program code embodied therewith, the computer readable program code executable by a processor to perform an operation comprising:
determining that a parse of an input string comprising a plurality of tokens is incomplete;
generating, based on a machine learning (ML) model:
(i) a plurality of candidate addition tokens for adding to the input string, and (ii) a plurality of candidate removal tokens for removing from the input string comprising, for a first token of the plurality of tokens:
identifying a second token of the plurality of tokens, wherein the second token is immediately subsequent to the first token in the input string;
processing the first and second tokens using the ML model to generate a potential new token to be inserted between the first and second tokens without removing either the first or second token from the input string;
identifying a third token of the plurality of tokens, wherein the third token is immediately subsequent to the second token in the input string; and
processing the first and third tokens using the ML model to generate a potential removal token indicating a confidence that the second token should be removed from the input string;
selecting, from the plurality of candidate addition tokens and the plurality of candidate removal tokens, a first candidate token; and
modifying the input string based on the first candidate token to facilitate a complete parse of the modified input string by a parser.

9. The computer program product of claim 8, wherein the first candidate token comprises a first candidate addition token of the plurality of candidate addition tokens, wherein the first candidate token is selected based on a confidence score for the first candidate token exceeding a respective confidence score for each of the plurality of candidate addition tokens and each of the plurality of candidate removal tokens, wherein modifying the input string comprises:
identifying a first and a second token of the plurality of tokens associated with the first candidate addition token; and
inserting the first candidate addition token between the first token and the second token in the input string.

10. The computer program product of claim 8, wherein the first candidate token comprises a first candidate removal token of the plurality of candidate removal tokens, wherein the first candidate token is selected based on a confidence score for the first candidate token exceeding a respective confidence score for each of the plurality of candidate addition tokens and each of the plurality of candidate removal tokens, wherein modifying the input string comprises:
identifying a first and a second token of the plurality of tokens associated with the first candidate removal token; and
removing the first candidate removal token from the input string, wherein the first candidate removal token is disposed between the first and second tokens in the unmodified input string.

11. The computer program product of claim 8, wherein each of the plurality of candidate addition tokens is associated with a respective confidence score that exceeds an addition threshold, wherein each of the plurality of candidate removal tokens is associated with a respective confidence score that exceeds a removal threshold.

12. The computer program product of claim 8, the operation further comprising:
determining that the parser can parse the modified input string; and
parsing the modified input string by the parser to generate a parse tree representing the modified input string.

13. The computer program product of claim 8, the operation further comprising:
determining that the parser cannot parse the modified input string;
selecting, from the plurality of candidate addition tokens and the plurality of candidate removal tokens, a second candidate token;
modifying the input string based on the second candidate token; and
determining that the parser can parse the input string modified based on the second candidate token.

14. The computer program product of claim 8, the operation further comprising prior to determining the parse of the input string is incomplete:
receiving a training corpus comprising a plurality of strings;
training the ML model based on the training corpus, wherein the ML model learns, for each respective token in the training corpus, a respective plurality of weights relative to each respective pair of tokens in the training corpus, wherein each of the plurality of weights indicates either (i) a confidence that the respective token should be inserted between the respective pair of tokens, or (ii) a confidence that the respective token should be removed from between the respective pair of tokens.

15. A system, comprising:
a processor; and
a memory storing one or more instructions which, when executed by the processor, performs an operation comprising:
  determining that a parse of an input string comprising a plurality of tokens is incomplete;
  generating, based on a machine learning (ML) model: (i) a plurality of candidate addition tokens for adding to the input string, and (ii) a plurality of candidate removal tokens for removing from the input string comprising, for a first token of the plurality of tokens:
    identifying a second token of the plurality of tokens, wherein the second token is immediately subsequent to the first token in the input string;
    processing the first and second tokens using the ML model to generate a potential new token to be inserted between the first and second tokens without removing either the first or second token from the input string;
    identifying a third token of the plurality of tokens, wherein the third token is immediately subsequent to the second token in the input string; and
    processing the first and third tokens using the ML model to generate a potential removal token indicating a confidence that the second token should be removed from the input string;
  selecting, from the plurality of candidate addition tokens and the plurality of candidate removal tokens, a first candidate token; and
  modifying the input string based on the first candidate token to facilitate a complete parse of the modified input string by a parser.

16. The system of claim 15, wherein the first candidate token comprises a first candidate addition token of the plurality of candidate addition tokens, wherein the first candidate token is selected based on a confidence score for the first candidate token exceeding a respective confidence score for each of the plurality of candidate addition tokens and each of the plurality of candidate removal tokens, wherein modifying the input string comprises:
  identifying a first and a second token of the plurality of tokens associated with the first candidate addition token; and
  inserting the first candidate addition token between the first token and the second token in the input string.

17. The system of claim 15, wherein the first candidate token comprises a first candidate removal token of the plurality of candidate removal tokens, wherein the first candidate token is selected based on a confidence score for the first candidate token exceeding a respective confidence score for each of the plurality of candidate addition tokens and each of the plurality of candidate removal tokens, wherein modifying the input string comprises:
  identifying a first and a second token of the plurality of tokens associated with the first candidate removal token; and
  removing the first candidate removal token from the input string, wherein the first candidate removal token is disposed between the first and second tokens in the unmodified input string.

18. The system of claim 15, wherein each of the plurality of candidate addition tokens is associated with a respective confidence score that exceeds an addition threshold, wherein each of the plurality of candidate removal tokens is associated with a respective confidence score that exceeds a removal threshold.

19. The system of claim 15, the operation further comprising:
  determining that the parser can parse the modified input string; and
  parsing the modified input string by the parser to generate a parse tree representing the modified input string.

20. The system of claim 15, the operation further comprising:
  determining that the parser cannot parse the modified input string;
  selecting, from the plurality of candidate addition tokens and the plurality of candidate removal tokens, a second candidate token;
  modifying the input string based on the second candidate token; and
  determining that the parser can parse the input string modified based on the second candidate token.

* * * * *